United States Patent [19]

Pember et al.

[11] Patent Number: 5,009,175
[45] Date of Patent: Apr. 23, 1991

[54] POTATO PLANTER

[76] Inventors: David A. Pember, P.O. Box 132; James R. Schrader, P.O. Box 996, both of Glenns Ferry, Id. 83623

[21] Appl. No.: 469,228

[22] Filed: Jan. 24, 1990

[51] Int. Cl.$^5$ ............................ A01C 5/06; A01C 9/08
[52] U.S. Cl. ..................................... 111/173; 111/104; 111/77; 111/177; 111/908
[58] Field of Search .................. 111/100, 104–105, 111/111, 170, 177, 173, 908, 925, 77

[56] References Cited

U.S. PATENT DOCUMENTS

| 140,965 | 7/1873 | Svendsen | 111/173 X |
| 3,982,671 | 9/1976 | Curl . | |
| 4,715,302 | 12/1987 | Briggs | 111/173 |

FOREIGN PATENT DOCUMENTS

2358965  6/1975  Fed. Rep. of Germany ...... 111/173

*Primary Examiner*—Danton D. DeMille
*Attorney, Agent, or Firm*—Frank J. Dyka; Craig M. Korfanta

[57] ABSTRACT

A potato planter (10) having a horizontally disposed auger housing (23) divided longitudinally into two halves by separator plate (37), said housing being open at the top at the forward end for receiving seed potatoes from seed hopper (11) and open at the bottom at the rearmost end for dropping seed potatoes into a planting furrow. A pair of primary single blade augers (20) disposed for axial rotation within said housing along and adjacent to each side of separator place (37). A pair of secondary filler blade augers (21), each in interfitting parallel axial relationship with a primary auger so as to interfit the filler blade of a secondary auger between the reach of the blade of each primary auger so as to form a plurality of traveling compartments between the unfilled reaches of the blade of the primary augers and the sides of the separator plate for transporting seed potatoes from the forward end of the auger housing to the rearmost opening.

6 Claims, 7 Drawing Sheets

POTATO PLANTER

BACKGROUND OF THE INVENTION

1. Technical Field

This invention relates to an improved potato planter, and more particularly, to a potato planter which utilizes pairs of interfitting, rotating augers to form traveling compartments within the auger housing to meter the flow of potato seed pieces from the hopper to the discharge chute.

2. Background Art

Tuber potatoes are one of the more sophisticated row crop plants grown in the United States of America. There is a wide variety of potatoes grown in various locations across the North American Continent. For purposes of illustration in the background section, the Russet Burbank potato, which is grown across the state of Idaho and in eastern portions of the states of Washington and Oregon, will be used.

The intended end use of the potato crop will determine the size of the potatoes desired from any particular growing field. If the intended end use of potatoes is processing into french fries, then it is desirable to produce the largest possible potatoes in that particular field. If, on the other hand, the intended use of the potatoes is to be fresh packed and sold as fresh produce or as baking potatoes, then a smaller size is desired.

Aside from extreme abnormal weather conditions which can obviously affect size and quantity of a potato crop, the dominant factor in determining the end size of the crop is the spacing of the seed at the time of planting. For example, with the Russet Burbank potato variety a nine inch spacing between seed and rows 36 inches apart will produce potatoes suitable for fresh pack produce and sale as baking potatoes. On the other hand, spacing of the same potato seed 14 inches apart in the same rows 36 inches apart will produce fewer, but much larger potatoes suitable for processing into frozen french fries.

Potatoes are also one of the more expensive crops to grow. Current practice today requires extensive cultivation, usually accomplished by means of aerial applications of chemicals, and the use of expensive and sophisticated harvesting and handling equipment to prevent bruising or damage to the harvested crop. In today's competitive agricultural market, it is therefore critical to the farmer that the entire field be completely planted with potato seed, each set at the desired spacing interval along each row.

Potato seed, as a general rule, is grown in special disease free regions in carefully monitored disease free fields. It is desirable that the seed potatoes be smaller than standard production crops grown for human consumption. And, like standard potato crops, the size of the seed is determined by the interval spacing of the seed potato in the rows of the field. Potato seed is notoriously expensive and its waste by over planting in the field is an unnecessary expense to the commercial farmer. In connection with this, it has been known for many years that it is not necessary to plant an entire potato as seed for a single potato plant. All that is required for seed is a piece of a seed potato containing one potato eye. Therefore, it is common practice to cut seed potatoes into pieces prior to planting.

This creates another set of problems in that the potato seed is not round or of any uniform shape. Generally, it is hemispherical in shape, with a significant portion being cylindrical or even oblong. Therefore, a pile of potato seed such as that contained in a planter hopper, does not flow as well as, for example, grain or corn seed would. The pieces of potato seed have a tendency to interlock and bridge forming a structural mass.

As a result, the farmer desiring to plant potato seed is faced with three problems, the first is to how to get the interlocked and bridged seed out of the hopper and into the ground, the second, how to minimize the transmission of disease from a diseased piece of seed potato to other seed potatoes given the fact that significant portions of the cut seed pieces are not covered by the protective potato skin, and third, how to insure that there are no skips in the planting process, that is to say that there is a potato seed placed every 9 inches or every 14 inches or whatever the desired interval may be, and finally, how to prevent the waste of seed by the planting of doubles. That is to say two or more pieces of potato at each spacing interval instead of just one. Each of these problems has significant financial consequences to the farmer. The costs to the farmer of growing and harvesting a field planted at an 85% capacity rate is exactly the same as that for the same field planted at 100% of its capacity. Thus, whatever the skip rate is in planting, translates directly into a loss of profits. A field planted to 105% of its capacity due to double planting translates into an increased seed cost which also results in a loss of profits. And finally, transmission of diseases such as leaf ring virus through the seed results in discolored potatoes and a significant decrease in their market value.

Hand planting of potato seed is not feasible given the enormous acreages planted each year. Standard planting equipment such as grain drills for wheat and corn cannot be used since the potato seed does not flow due to its shape. As a result, potato planters all have a common conceptual basis in that some sort of mechanism is used to pick individual pieces of potato out of the hopper then transport and drop it into a furrow being plowed in the row or hill, after which the furrow is covered leaving the potato seed piece in the ground approximately 2 to 4 inches below the surface.

Figure 1:
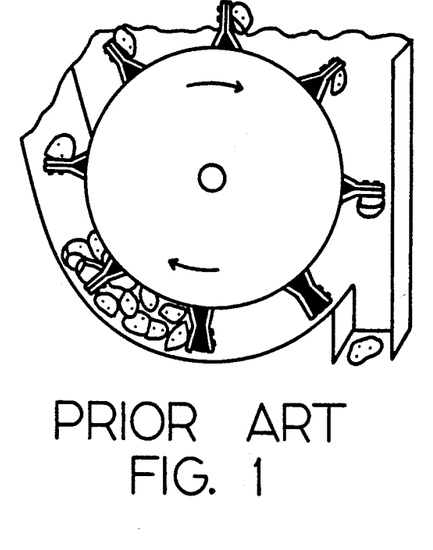
FIG. 1 is a representational side view of a prior art spiked wheel planter assembly.

Two common methods of picking the potato seed pieces from the hopper are in use today. Perhaps the most common is the use of the spiked wheel which is shown in FIG. 1 and identified as prior art. With this method, a wheel having radial spokes with spikes emanating therefrom is rotated beneath the hopper, where the spikes impale pieces of potato which are gravity fed into the wheel chamber from the hopper. A cam mechanism is provided within the wheel assembly to withdraw the spikes from the radial spokes as the wheel rotates to drop the potato seed piece into a discharge chute. The problems with this type of potato planter are twofold. First, diseases are easily transmitted from one piece of potato seed to another compounding any problem with a small percentage of the seed which may be diseased when planted. Secondly, this type of planting mechanism has a tendency, by its design, to produce skips in the rows of seed potatoes.

A second mechanism commonly in use to retrieve seed potato from the hopper is the use of seed cups on a traveling conveyor belt. This type of mechanism is shown and described in CURL, U.S. Pat. No. 3,982,671. While this type of cup mechanism reduces the transmission of disease, in that the seed pieces are not impaled upon a common spike, it has the propensity to plant doubles since the cups will often pick up two pieces of potato seed instead of just one.

Accordingly, what is needed is a mechanism by which seed can be retrieved from the hopper and transported to the discharge chute without impalement of the seed pieces. Another object of the invention is to provide for a transport mechanism which does not skip or double plant the seed pieces in the rows of planted crop.

DISCLOSURE OF INVENTION

These objects are accomplished by use of an improved potato seed planter which utilizes conventional and well known perimeter and potato planter frame, axle and wheels means for use in transporting the planter, hydraulic controls for raising the planter during transport and lowering it to furrowing depth during planting, a seed hopper having a shaker plate at its bottom to prevent bridging of the seed potatoes, and a drop chute into which the shaker plate urges the unbridged potato seed pieces.

A generally horizontally oriented auger housing having a horizontally oriented longitudinal axis and divided along its longitudinal axis into equal and parallel halves by a separator plate is provided, and divided transversely into front sections and rear sections by an attached transverse support plate. The front sections of the auger housing are open at the top, and the rear sections have, at the rearmost end, a shared downwardly oriented discharge chute opening from both auger housing halves. The auger housing is attached to the base of the drop chute for the passage of seed potato pieces from the hopper drop chute through the receiver opening into each auger housing half.

A pair of primary single blade augers are disposed for axial rotation within the auger housing along both sides of the separator plate with each auger blade rotating in close conformity to the side of the separator plate. A pair of secondary single blade augers are disposed within the front sections of the auger housing in interfitting, parallel axial relationship with each of the primary augers so as to interfit the blade of a secondary auger between the reach of the blade of each primary auger on the side of each primary auger opposite the separator plate thereby forming a plurality of traveling compartments defined by the sequential reaches of the primary auger blade and the separator plate.

Drive for the augers is provided by means of spur gears attached to one end of each of the augers, thereby providing a mechanical gear arrangement, each in opposite synchronized rotation, one to the other. Thus, when the augers are being driven, the traveling compartments are formed between the reaches of the primary auger blades and the sides of the separator plate for transporting pieces of seed potato through the auger housing from the front sections to the discharge chute to the rear section where they are dropped into the discharge chute.

A return auger is provided for returning pieces of seed potato which are ejected from the traveling compartments of the primary auger in the rear section of the auger housing to the adjoining front section of the auger housing.

Drive power for the augers can be derived from the hydraulic system of the towing tractor, an individual hydraulic motor or mechanically either from the power take off of the towing tractor or a separate, independent, traveler wheel. Speed adjustment means is provided to achieve the desired interval spacing along the rows of planted potatoes.

Conventional plow means are provided and attached to the planter in front of the discharge chute to prepare a furrow into which pieces of seed potato are dropped. Disking means also attached to the planter trail behind the discharge chute to cover the furrow after potato pieces have been dropped into it.

BEST MODE FOR CARRYING OUT INVENTION

Figure 2:
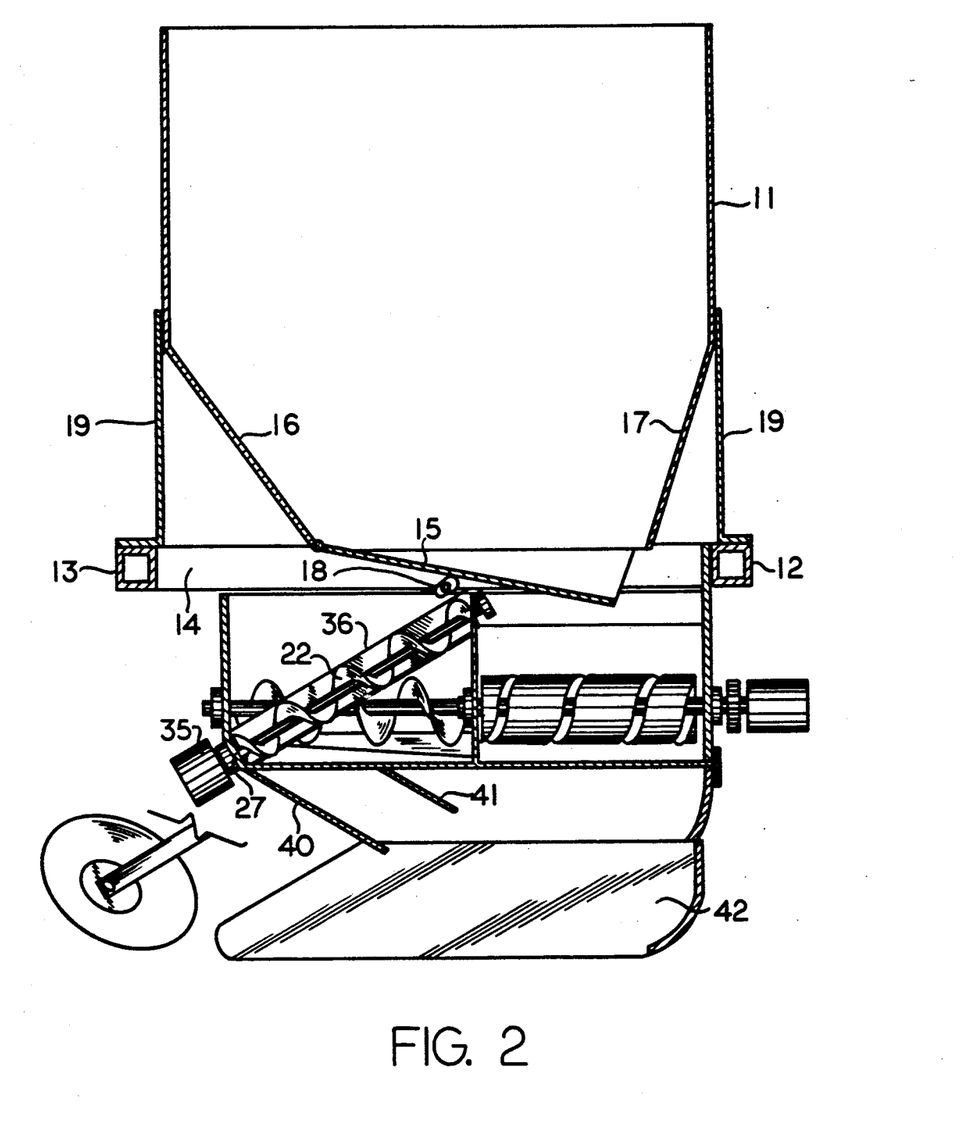
FIG. 2 is a sectional side view showing the auger assembly for the potato planter.
Figure 8:
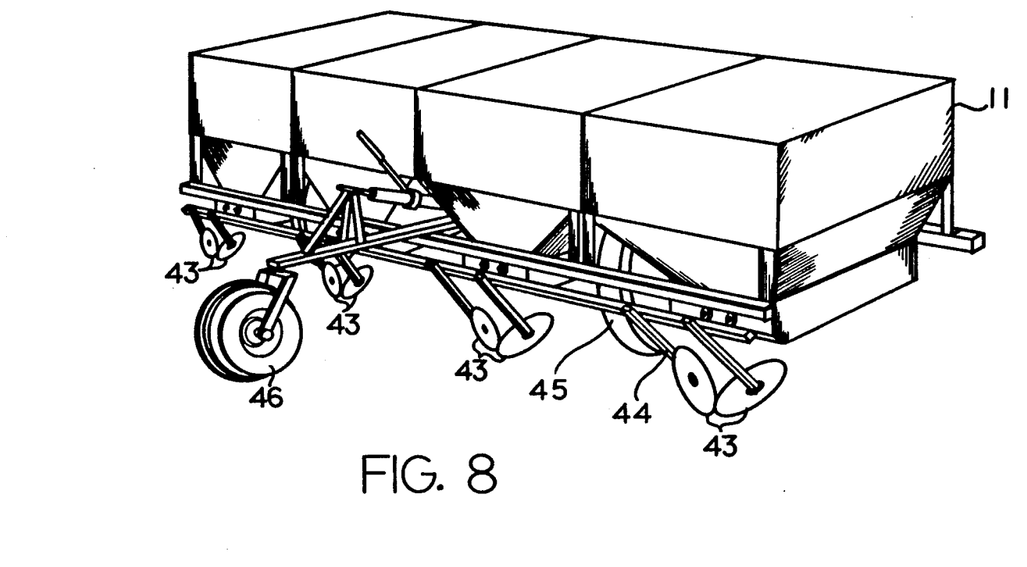
FIG. 8 is a perspective representational view of a four row potato planter.

As shown in FIGS. 2 and 8, potato planter 10 incorporates certain conventional and well known features of potato planters including hopper 11, a perimeter frame formed of front frame member 12, rear perimeter frame member 13, and side perimeter frame members 14, and hopper support struts 19. Also of conventional design are rear strut 44, opposing angled disks 43 and furrow shovels 42.

A conventional axle and wheel assembly 45 is provided for purposes of transporting the potato planter to and from the fields to be planted as well as hydraulic height adjustments, as generally shown in FIG. 8, for raising the potato planter for purposes of transport and lowering to furrowing depth when planting. All of these features are well known in the art and play no part of the present invention. The teachings of CURL, U.S. Pat. No. 3,982,671, are incorporated by reference for purposes of disclosure of an embodiment of these well known and conventional features of a potato planter.

Figure 3:
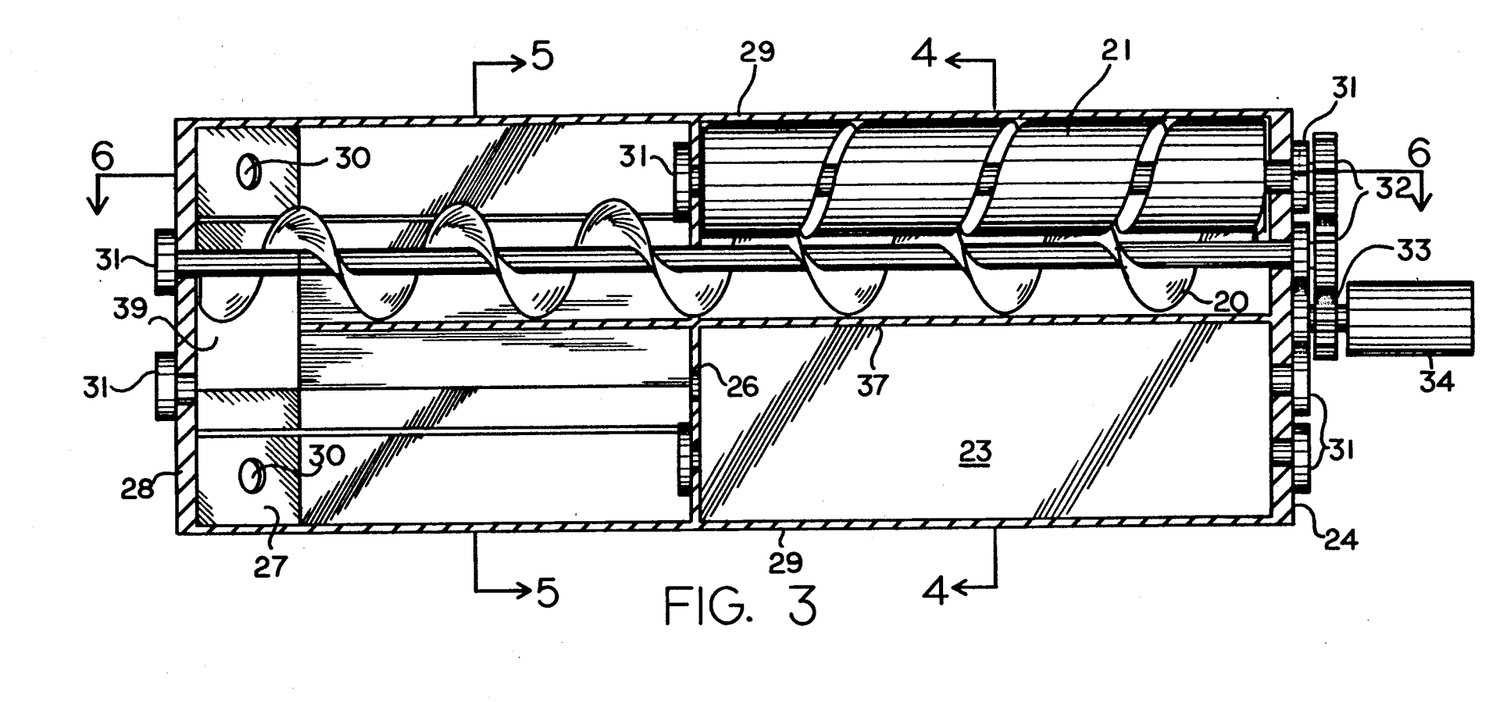
FIG. 3 is a representational top plan view of a partially assembled auger assembly.
Figure 4:
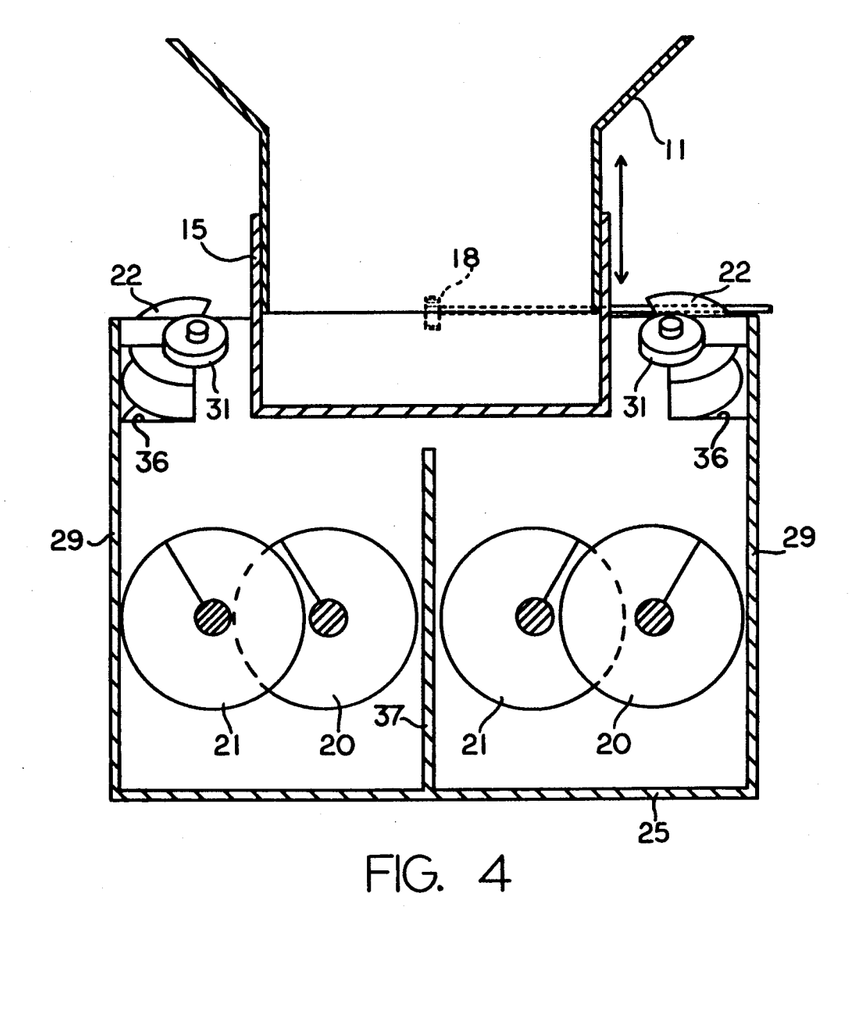
FIG. 4 is a representational sectional front view of the auger assembly showing the intermediate support plate taken along section line 4 of FIG. 3.
Figure 5:
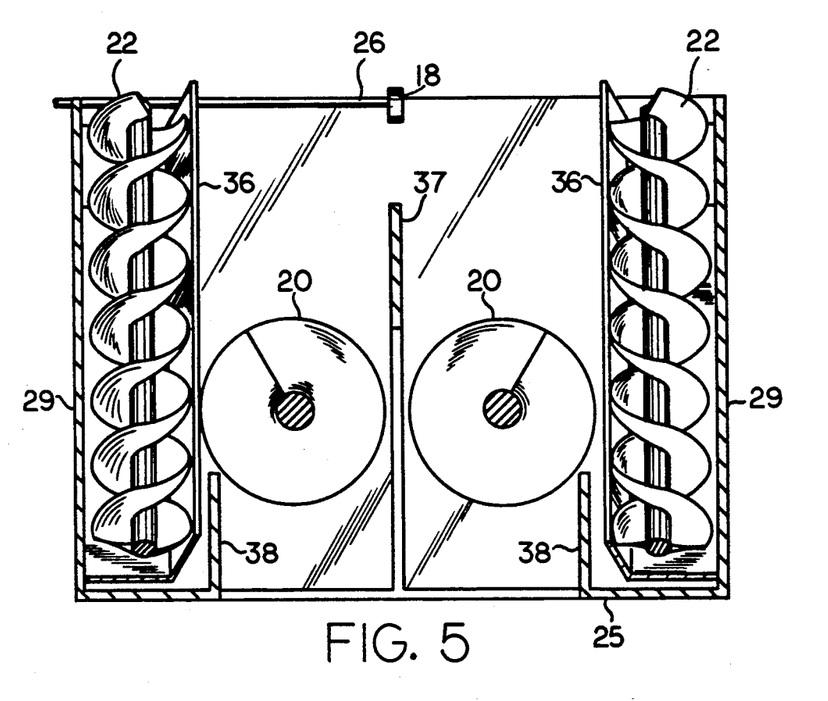
FIG. 5 is a representational sectional end view taken along section line 5 of FIG. 3.
Figure 6:
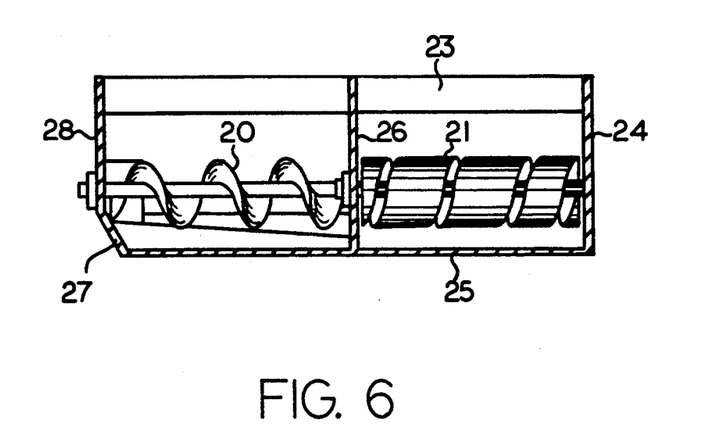
FIG. 6 is a representational sectional side view taken along section line 6 of FIG. 3.

The improvement which represents the present invention is shown to advantage in FIGS. 2, 3, 4, 5, 6 and 7. Auger housing assembly 23 as shown in FIGS. 3 and 6, is formed of front plate 24, bottom plate 25, rear incline plate 27 and back plate 28. These various plates form together to define a generally rectangular auger housing assembly 23. Now referring to FIG. 3, which is a top view of auger housing assembly 23, it can be seen that the assembly is divided into two compartments by separator plate 37 which runs the longitudinal length between front plate 24 and drop hole 39. Separator plate 37 divides the auger housing assembly 23 along its longitudinal axis into two parallel equally sized halves into which are axially mounted pairs of primary and secondary augers.

Figure 7:
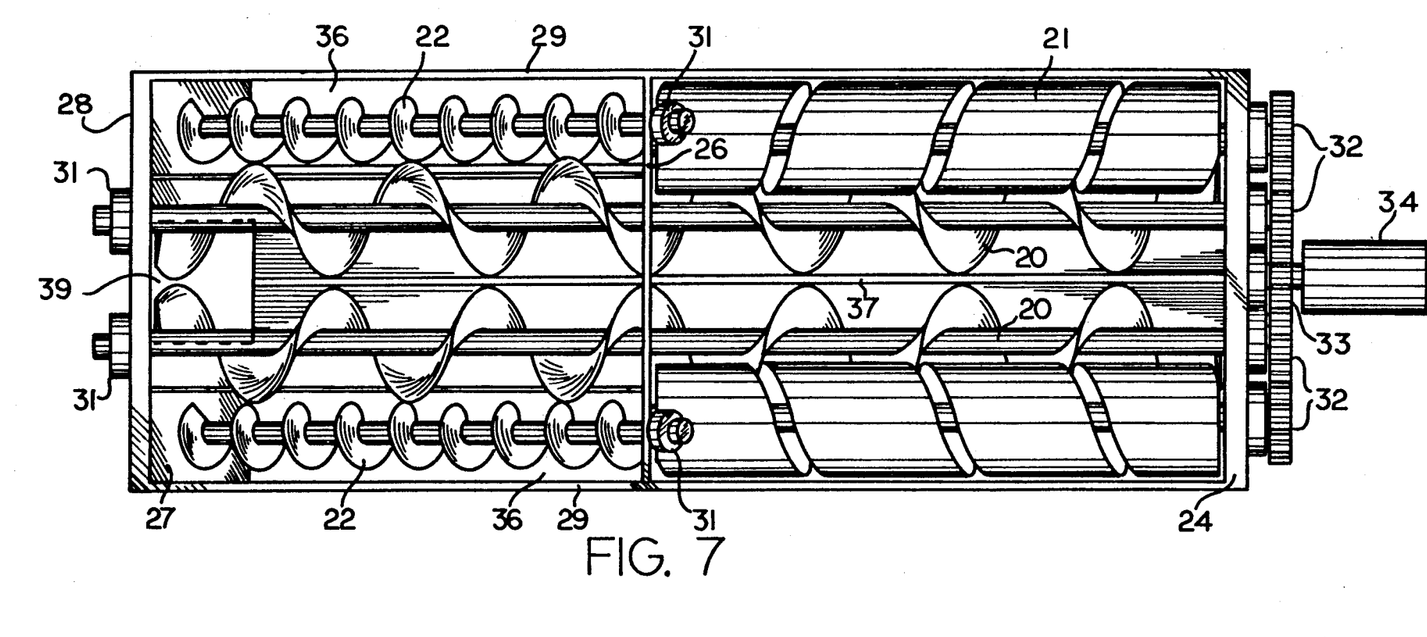
FIG. 7 is a sectional top view showing the auger housing assembly.

While it should be apparent that the present invention will work with only one pair of primary and secondary augers, the incorporation of two into the design halves the speed at which the augers must turn to deliver the same volume of seed potato pieces to drop chute 39 as will be shown later. Viewed from the top as shown in FIG. 3, are one set of primary auger 20 and secondary auger 21. Primary auger 20 has a single helical blade of predetermined reach and pitch. Secondary auger 21 is formed as a helical filler blade having receiving holes of identical reach and pitch as that of primary auger 20. Each are mounted for axial rotation within the auger housing by means of bearing assemblies 31, which are attached in the conventional manner, to the front and back plates of the auger housing for primary auger 20 and to front plate 24, and intermediate support plate 26 for the secondary or filler auger 21. An identical assembly of primary and secondary augers as shown in FIGS. 4, 5 and 7, are similarly mounted within auger housing assembly 23.

Each pair of primary and secondary augers are driven by intermeshing, identically sized, spur gears 32. Idler gear 33 is provided and intermeshes with both sets of spur gears 32. Primary drive is provided by hydraulic motor 34 through intermeshing idler gear 33 which intermeshes with both sets of spur gears 32. In this manner, both sets of primary and secondary augers are driven at identical speeds. The only difference between the two pairs of primary and secondary augers is that they must be of opposite rotational or helical pitch since they are all being driven in the same rotational direction as a result of the use of idler gear 33. The use of idler gear 33 is required since the pairs of primary and secondary augers have interfitting reaches of blade hence the shafts of the paired primary and secondary augers are closer together than is possible between the two sets of pairs since the blades of the primary augers must be farther apart, so as not to interfit and must be separated by separator plate 37.

For purposes of simplicity and clarity in this detailed description, only one auger assembly is described. However, in practice as is shown in FIG. 8, a typical potato planter is formed of extended width sufficient to plant potatoes simultaneously in at least four separate rows in the field. However, each of the auger assemblies would function identically, and the auger assemblies as fabricated for four or six row planters would merely be duplicates one of the other.

In both the left and right halves of the auger housing, the primary augers are positioned such that the reach of the auger blades closely conforms to the surface of separator plate 37 or in the case of a single primary and secondary auger assembly, then in close conformance with a side of the auger housing.

Spur gears 32 and idler gear 33 provide a synchronized drive mechanism for all four augers. When any one of the spur gears or the idler gear is driven, it results in the rotation of all augers. This, together with the use of the secondary auger 21, results in the effect of filling in the blades of one-half of the space of the primary augers, and in turn results in a plurality of traveling compartments defined by the sequential reaches of the primary auger blades with the sides of separator plate 37.

Thus, by adjusting the rotational speed at which the augers are driven, one can adjust the rate at which the traveling compartments travel the length of the auger housing.

Referring to FIGS. 2 and 4, in operation seed potatoes are deposited into hopper 11. Front inclined hopper wall 17 and rear inclined hopper wall 16 form a functional hopper drop chute. Shaker plate 15 is provided and driven by cam 18 to provide a vibration of shaker plate 15, thus keeping the seed potato pieces agitated and unbridged. The drop chute formed at the base of hopper 11 from front inclined wall 17 and rear inclined wall 16, together with shaker plate 15, provide a means of urging unbridged pieces of potato seed into the front section of auger housing assembly 23.

As previously stated, and is shown in FIGS. 3 and 7, auger housing assembly 23 is divided longitudinally into mirror image assemblies. Intermediate support plate 26, in a like manner, transversely divides auger housing 23 into forward and rear sections. The forward section, that section of auger housing assembly 23 forward of intermediate support plate 26, is completely filled with paired primary and secondary auger assemblies as is shown in FIG. 7. Thus, potatoes dropping off of shaker plate 15 into the forward section of auger housing 23 are deposited either onto primary auger 20 or secondary auger 21 and will eventually drop into the traveling compartments defined between the reaches of blades of primary augers 20 and separator plate 37, and will be transported rearwardly through an opening in intermediate support plate 26 to the rear section of auger housing 23, which is defined between housing side walls 29, rear incline plate 27, back plate 28 and intermediate support plate 26.

In practice, whole seed potatoes are cut into individual seed pieces several weeks before planting in order to give the tuber potato organism an opportunity to scab over the cut portions of the potato, thus providing a protective membrane of some strength. Given that fact and the limited weight on the potatoes dropping into auger housing assembly 23 the seed pieces ride across the top of secondary auger 21 and the blades of primary auger 20, and eventually drop into the traveling compartments formed by the primary auger as it rotates against separator plate 37. Depending upon the size of the cut seed potatoes, and the speed at which the auger assembly is driven, it is possible for more than one seed piece to be traveling in one of these compartments at any given time. The seed is agitated by the mechanical motion, and seed pieces are both dropping in and being ejected out of the traveling compartments at more or less random intervals. In the forward section of auger housing 23, as seed pieces are being ejected out, they are being deposited atop secondary auger 21, and as a result others are being dropped back in.

However, in the rear section of auger housing 23, the motion of the seed pieces in the traveling compartments still results in ejection of seed pieces when two or more seed pieces are in the compartment, however in the case of the rear section, since there is no secondary filler auger, the pieces of seed that are ejected from the traveling compartments are dropped down into the rear section of housing 23 as shown in FIG. 3.

Those seed pieces remaining in the traveling compartments are then dropped through drop hole 39 in bottom plate 25 as shown in FIG. 3 and are transported through a drop chute formed of lower drop chute baffle 40 and upper drop chute baffle 41, to a position wherein they drop between the blades of furrow shovel 42 and into the furrow at the desired planting depth. Then, as the planter is traversing across the field, opposing pairs of furrow disks 43 recover the furrow behind the shovel and the dropped seed pieces, thus planting the potatoes at the desired depth and spacing.

In practice it has been found that by the use of the interfitting primary and secondary augers, and an abundant supply of seed pieces being dropped off of shaker plate 15, the farmer is assured that at least one, and occasionally two, seed pieces will be present in each traveling compartment defined by primary auger 20 and separator plate 37. Also, as a result of the absence of the secondary auger 21 in the rear compartment of auger housing assembly 23, the movement of the seed pieces in the traveling compartments will result in the ejection of all but one seed piece from the traveling compartments prior to reaching drop hole 39, thus significantly reducing the number of doubles that are planted and skips that are incurred by other conventional type potato planters.

If no means were provided for removing the multiple pieces of seed potato that are ejected from the traveling compartments of primary auger 20 in the rear section of auger housing 23, the ejected seed pieces would eventually accumulate and fill the rear section of auger housing 23. Accordingly, return auger 22 is provided in each half of auger assembly 23 as is shown in FIGS. 2, 4, 5 and 7. As shown in FIG. 2, return auger 22 is mounted between rear incline plate 27, through return auger mounting holes 30 as shown in FIG. 3, and intermediate support plate 26 by use of conventional bearing assemblies 31. Return auger chute 36 as shown in FIGS. 4, 5 and 7, is formed to provide, with auger 22, a return chute for transporting ejected pieces of seed potato up and over intermediate support plate 26 back into the forward compartment of auger housing 23. Filler baffles 38, as shown in FIG. 5, are provided to keep ejected seed potato pieces from inadvertently dropping through drop hole 39.

Potato planter 10 is designed to be pulled behind a tractor. Tractors in use today normally provide two different types of power transfer systems for towed devices, the first is hydraulic, and the second is mechanical, through what is known as a power take off shaft, or PTO. Either of these transfer devices is suitable for powering shaker plate 15 and cam 18, and the spur gears. In addition, and perhaps the most common method of providing power for the potato planter is a ground drive system, as shown in FIG. 8, wherein a trailing wheel provides mechanical power for driving the moving parts of the potato planter. Again, the method of providing power to the augers plays no part in the invention and is something that is currently well known in the art.

While there is shown and described the present preferred embodiment of the invention, it is to be distinctly understood that this invention is not limited thereto but may be variously embodied to practice within the scope of the following claims.

We claim:

1. An improved potato planter having a perimeter frame supporting a seed hopper, a hopper drop chute, and shaker plate to prevent the bridging of seed potato pieces in the drop chute and axle and wheel means, wherein improvement comprises:
   a generally horizontally oriented auger housing divided into a forward section and rear section by an attached transverse intermediate support plate, and with the forward section open at the top, and a downwardly opening discharge chute at the rearmost end, for receiving pieces of seed potato from the hopper drop chute through the open top of the front section;
   a primary single blade auger disposed longitudinally within said auger housing for axial rotation within said auger housing;
   a secondary filler blade auger disposed within the front section of said auger housing in interfitting parallel axial relationship with said primary auger so as to interfit the blade of the secondary auger between the reach of the blade of the primary auger on one side of the primary auger;
   means for rotating both the primary and secondary augers in synchronized, but opposite directions so as to create traveling compartments for transporting pieces of seed potato between the reaches of blade of the primary auger and the adjacent side of the auger housing;
   means for returning pieces of seed potato ejected from the said traveling compartments from the rear section of the auger housing to the front section of the auger housing;
   plow means for forming a seed furrow attached to the planter forward to the discharge chute; and
   disking means for covering seed in the furrow attached to the planter behind the discharge chute.

2. The improved potato planter of claim 1 wherein the means for rotating both primary and secondary augers in synchronized but opposite directions further comprise:
   a pair of intermeshing spur gears, each attached to the front end of each auger; and
   means for rotating said spur gears.

3. The improved potato planter of claim 1 wherein the means for rotating both the primary and secondary augers in synchronized but opposite directions further comprises means for varying the rotational speed of said primary and secondary augers.

4. An improved potato planter having a perimeter frame, including an axle and wheel means, supporting a seed hopper, a hopper drop chute, and shaker plate to prevent the bridging of seed potato pieces in the drop chute, axle and wheel means, wherein the improvement comprises:
   a generally horizontally oriented auger housing having a horizontally oriented longitudinal axis and being divided along its longitudinal axis into two equal and parallel halves by a separator plate and further divided into forward sections and rear sections by an attached transverse intermediate support plate and with the forward sections open at the top, and downwardly opening discharge chutes at the rearmost ends of the rear sections for receiving pieces of seed potato from the hopper drop chute through the open top of the front sections;
   a pair of primary single blade augers each disposed for axial rotation within said auger housing along one side of said separator plate with each auger blade rotating in close conformity to the side of the separator plate;
   a pair of secondary filler blade augers each disposed within front section of the auger housing in interfitting parallel axial relationship with a primary augers so as to interfit the filler blade of a secondary auger between the reach of the blade of each primary auger on the side of each primary auger opposite the separator plate;
   means for rotating said augers in synchronized but opposite directions so as to create travelling compartments between the reaches of blade of the primary augers and the adjacent surfaces of the separator plate;
   means for returning pieces of seed potato ejected from the said traveling compartments from the rear sections of the auger housing to the adjoining front sections of the auger housing;

plow means for forming a seed furrow attached to the planter forward of the discharge chute; and disking means for covering seed in the furrow, being attached to the planter behind the discharge chute.

5. The improved potato planter of claim 4 wherein the means for rotating both primary and secondary augers in synchronized but opposite directions further comprise:

a pair of intermeshing spur gears, each attached to the front end of each auger; and means for rotating said spur gears.

6. The improved potato planter of claim 4 wherein the means for rotating both the primary and secondary augers in synchronized but opposite directions further comprises means for varying the rotational speed of said primary and secondary augers.

* * * * *